(12) United States Patent
Simonnet et al.

(10) Patent No.: US 7,453,906 B2
(45) Date of Patent: Nov. 18, 2008

(54) SYSTEMS AND METHODS FOR PROVIDING AUTOMATIC NETWORK OPTIMIZATION WITH APPLICATION VARIABLES

(75) Inventors: Guillaume Simonnet, Bellevue, WA (US); Harry S. Pyle, Bellevue, WA (US); Richard L. Hasha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1128 days.

(21) Appl. No.: 10/251,457

(22) Filed: Sep. 19, 2002

(65) Prior Publication Data

US 2004/0081201 A1  Apr. 29, 2004

(51) Int. Cl.
*H04J 3/16* (2006.01)
*H04L 12/26* (2006.01)

(52) U.S. Cl. ..................... 370/469; 370/252
(58) Field of Classification Search ............ None
See application file for complete search history.

(56) References Cited

U.S. PATENT DOCUMENTS

| | | | |
|---|---|---|---|
| 6,646,676 B1* | 11/2003 | DaGraca et al. | 348/155 |
| 6,668,092 B1* | 12/2003 | Sriram et al. | 382/244 |
| 6,747,979 B1* | 6/2004 | Banks et al. | 370/401 |
| 2002/0124046 A1* | 9/2002 | Fischer et al. | 709/201 |
| 2003/0041311 A1* | 2/2003 | Poole et al | 717/100 |
| 2003/0231657 A1* | 12/2003 | Poon et al. | 370/469 |
| 2004/0044761 A1* | 3/2004 | Phillipi et al. | 709/223 |
| 2006/0015515 A1* | 1/2006 | Collazo | 707/100 |

OTHER PUBLICATIONS

Ahmad, I., "A Massively Parallel Fault-Tolerant Architecture for Time-Critical Computing," *J. Supercomputing*, 1995, 9(1-2), 135-162.

Betourne, C. et al., "Distributed Control Through Task Migration Via Abstract Networks," *Proceedings—5th International Conference on Distributed Computing Systems*, May 13-17, 1985, 532-538.

Brandauer, C. et al., "Comparison of Tail Drop and Active Queue Management Performance for Bulk-Data and Web-Like Internet Traffic," *Proceedings, Sixth IEEE Symposium on Computers and Communications*, Jul. 3-5, 2001, 122-129.

(Continued)

*Primary Examiner*—Edan Orgad
*Assistant Examiner*—Blanche Wong
(74) *Attorney, Agent, or Firm*—Woodcock Washburn LLP

(57) ABSTRACT

Systems and methods for automatic network optimization with application variables are provided. Operation of a protocol stack, such as an SCP stack, relies upon a number of persistent variables, which are remembered over power and reset cycles, used in connection with controlling protocol timing and behavior. These application variables are handled at the network layer of the protocol and may be assigned values by an address space arbitrator, which is an entity responsible for managing the logical network. Each node member of a logical network maintains a set of values for its application variables. This set can be handled by the protocol's network layer, and can be saved in persisted storage. Since the variable values may be modified asynchronously, they are treated as volatile and thus, when a variable is used, its value is obtained through an application interface exposed by a network layer, e.g., through polling. An exception to this procedure is a data link layer, which obtains some operating parameters on every call by the network layer. Optimization of application variables enables reliable operation of a logical network operating under low bandwidth network conditions, etc.

138 Claims, 7 Drawing Sheets

OTHER PUBLICATIONS

Bruso, S.A., "A Failure Detection and Notification Protocol for Distributed Computing Systems," *Proceedings—5th International Conference on Distributed Computing Systems*, May 13-17, 1985, 116-123.

Cheng, R. et al., "Reliable Synchronization in Computer Networks," *FTCS 13th Annual International Symposium. Fault-Tolerant Computing. Digest of Papers*, Jun. 28-30, 1983, 178-181.

Chung, I.F. et al., "A GA-Based Fuzzy Adaptive Learning Control Network," *Fuzzy Sets and Systems*, 2000, 112(1), 65-84.

Dawson, R.J. et al., "Fault-Tolerant Extensions of Star Networks," *Networks*, 1991, 21(4), 373-385.

Fahmy, S. et al., "Design and Simulation of Asynchronous Transfer Mode—Available Bit Rate End System Congestion Control," *Simulation-Transaction of the Society for Modeling and Simulation International*, 2002, 78(3), 150-162.

Ghozati, S.A., "Multi-Dimensional Token Ring Networks: Routing and Operation Protocols," *Computers & Electrical Engineering*, 1997, 23(3), 151-164.

Huges Aircraft, "Network Analysis Test Sets to 110 GHz," *Microwave J.*, 1985, 28(1), 172.

Itoh, K. et al, "An Integrated Method for Parameter Tuning on Synchronized Queueing Network Bottlenecks by Qualitative and Quantitative Reasoning," *IEICE Trans. Inf. & Syst.*, 1992, E75-D(5), 635-647.

Khasnabish, B. et al., "Performance Evaluation of a Deflection Routing Strategy in Supra-High-Speed Packet Switching Networks," *Proceedings of 36th Midwest Symposium on Circuits and Systems*, Aug. 16-18, 1993, 1, 161-164.

Khasnabish, B., "A New Method for Evaluating Packet Routing Policies in Supra-High-Speed Metropolitan (or Wide) Area Networks," *Computer Networks and ISDN Systems*, 1993, 26(2), 195-216.

Kuroe, Y. et al., "New Computer-Aided Method of Distortion Sensitivity-Analysis and Its Elimination Scheme for Power Electronic Circuits," *IEEE Trans. on Power Electronics*, 1986, PE-1(4), 200-209.

Lee, S. et al., "Intelligent Performance Management of Networks for Advanced Manufacturing Systems," *Proceedings of 2000 IEEE International Conference on Industrial Electronics, Control and Instrumentation*, Oct. 22-28, 2000, 3, 2153-2158.

Lockhart, C.M. et al., "Dynamics of Large Scale Distributed Networks," *1984 Winter Simulation Conference Proceedings*, Nov. 28-30, 1984, 602-603 (Abstract only).

Mon-Yen Luo et al., "Constructing Zero-Loss Web Services," *Proceedings IEEE Infocom 2001. Conference on Computer Communications. Twentieth Annual Joint Conf. of the IEEE Computer and Communications Society*, Apr. 22-26, 2001, 1781-1790.

Mookerjee, P. et al., "Determining the Updating Interval of a Round Robin Sequence for Token Passing Mobile Networks," *35th IEEE Vehicular Technology Conference: Efficiency, Conservation and Productivity*, May 21-23, 1985, 106-111.

Nagarajan, V. et al., "A Simulation Study of Computer Communication Protocols in the Presence of Unsymmetric Traffic," *1983 Proceedings of the International Conference on Systems, Man and Cybernetics*, Dec. 29, 1983-Jan. 7, 1984, 699-704.

Oates, M.J., "Evolutionary Algorithm Performance Profiles on the Adaptive Distributed Database Management Problem," *BT Technology J.*, 2000, 18(4), 66-77.

Reddi, A.V., "Terminal Buffer Memory Analysis in Resource Sharing Local Computer Networks," *Computers & Electrical Engineering*, 1986, 12(1-2), 39-49.

Segall, A. et al., "A Distributed Protocol for Maintaining Central Network Control," *J. Telecommunication Network*, 1984, 3(3), 268-275.

Subhlok, J. et al., "Automatic Node Selection for High Performance Applications on Networks," *SIGPLAN Notices*, May 4-6, 1999, 34(8), 163-172.

Wang, G.J. et al., "Cascade Steepest Descendant Learning Algorithm for Multilayer Feedforward Neural Network," *JSME Int'l J. Series C—Mechanical Systems Machine Elements and Manufacturing*, 2000, 43(2), 350-358.

Wang, X. et al., "IP Multicast Fault Recovery in PIM over OSPF," *Proceedings of ICNP 2000, 8th IEEE Conference on Network Protocols*, Nov. 14-17, 2000, 116-125.

Witzke, E.L. et al., "Tuning Computer Communications Networks and Protocols," *Tenth Annual International Phoenix Conference on Computers and Communications*, Mar. 27-30, 1991, 573-579.

Xu, S.G. et al., "Performance Evaluation of TCP Algorithms in Multi-Hop Wireless Packet Networks," *Wireless Comm. And Mobile Computing*, 2002, 2(1), 85-100.

Dudek-Dyduch, E. et al., "The Adaptive Tuning of Parameters of Neural network in the Analysis of Fringe Pattern Images in the Computer Vision," *Neural Networks in Engineering Systems. Proceedings of the 1997 International Conference on Engineering Applications of Neural Networks*, Jun. 16-18, 1997, 1, 75-78.

\* cited by examiner

SYSTEMS AND METHODS FOR PROVIDING AUTOMATIC NETWORK OPTIMIZATION WITH APPLICATION VARIABLES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright ©1999-2002, Microsoft Corp.

FILED OF THE INVENTION

The present invention is directed to systems and methods for providing automatic network optimization. More particularly, the present invention is directed to systems and methods for providing automatic network optimization with application variables.

BACKGROUND OF THE INVENTION

Distributed computing is a field of study that has received increased attention and study in recent years, as network interconnectivity, from wired to wireless, of computing devices and objects continues to mature and computing devices and objects of all kinds continue to proliferate. To this end, a variety of protocols can be used to enable computing devices and objects of all sorts to communicate with one another in a manner that is independent of the particularities of the source and target computing devices.

Examples of such protocols that have been developed include Simple Control Protocol (SCP), x10, and CEBus®. SCP, for instance, is a lightweight device-control protocol that allows manufacturers to create small, intelligent devices that can communicate with each other in a secure and robust manner over low-speed communication networks such as household power lines. With SCP, devices with limited computing power and memory resources—such as light switches, alarm clocks, and appliances—can be part of a peer-to-peer network of other SCP devices. Devices in an SCP network can also participate in more sophisticated Universal Plug and Play (UPnP) networks through a software component called a bridge, such as a UPnP to SCP bridge.

The following examples describe some typical scenarios that SCP and other protocols can make possible. Automated lights and light switches can be enabled using SCP such that light switches and fixtures can be controlled from a PC. A homeowner can change "which switches control which lights" without needing to call an electrician to rewire the physical circuits. Interactions among small appliances can also be enabled using SCP. For instance, an alarm clock can automatically start a coffee maker. Interactions among SCP and UPnP devices can also be enabled using SCP. For instance, a homeowner can place a tape in a UPnP-capable VCR and press "Play." The VCR then sends a UPnP event to a rules engine, which places the room into a home theater mode. The rules engine then turns the UPnP TV on and connects it to the VCR audio and video outputs. Then, through an SCP to UPnP bridge, the engine tells the SCP room lights to dim and closes the SCP blinds.

One can thus readily see that SCP, and other logical networks like SCP, are powerful vehicles for communication across a variety of computing devices. One can also appreciate that a variety of scenarios are possible with SCP, when one considers the possibility of any computing device or object being able to communicate simply and easily with any other computing device or object.

However, the above-described scenarios presume ideal, or near ideal, network conditions, and in contrast, often the actual physical medium utilized for communications in a logical network is not ideal. For instance, in the case of power line communications, data is not always guaranteed to arrive at its destination, or when it does, there may be some interference along the way that distorts the data or renders it unrecognizable. Similarly, on the reception side of data communications, interference can also be of impact. For instance, with compact fluorescent bulbs, there can sometimes be bad switching harmonic energy that interferes with data communications. Certain types of data modulation, while more expensive, can more reliably communicate data and thus, a set of network tuning parameters would be desirable for dynamic tuning of a network according to its condition(s). For another example, there are times when an acknowledgement of a unicast message is not received, and accordingly, it is unknown what happened to the unicast message. In certain circumstances, it would be desirable for the message to be re-unicast, and in some cases re-unicast multiple times. In connection with such logical network(s), therefore, it would be desirable to provide handling of application variables across logical network(s) for dynamic tuning of the logical network(s) according to the optimal conditions of the network. It would be further desirable to provide improved optimization of application variables across the logical network.

SUMMARY OF THE INVENTION

In view of the foregoing, the present invention provides systems and methods for automatic network optimization with application variables. Operation of a stack of a protocol, such as an SCP stack, relies upon a number of persistent variables, which are remembered over power and reset cycles, used to control protocol timing and behavior. These application variables are handled at the network layer of the protocol and may be assigned values by an address space arbitrator, which is an entity responsible for managing the logical network. Each node member of a logical network maintains a set of values for its application variables. This set can be handled by the protocol's network layer, and can be saved in persisted storage. Under normal operating circumstances, the values of the variables are the same for every node on the logical network. Since the variable values may be modified asynchronously, they are treated as volatile and thus, when a variable is used, its value is obtained through an application interface exposed by the network layer, e.g., through polling. An exception to this procedure is the data link layer, which obtains some operating parameters on every call by the network layer. The invention thus provides for optimization of application variables for reliable operation of a logical network operating under low bandwidth network conditions.

Other features and embodiments of the present invention are described below.

BRIEF DESCRIPTION OF THE DRAWINGS

The systems and methods for providing automatic network optimization with application variables in accordance with the present invention are further described with reference to the accompanying drawings in which.

DETAILED DESCRIPTION OF THE INVENTION

Overview

As described above, there is a need for improved optimization and handling of application variables across a logical network. The systems and methods of the invention thus provide automatic network optimization with application variables. In this regard, a stack of a network protocol relies upon various persistent variables, i.e., the variables are remembered over power and reset cycles, which variables control protocol timing and behavior. The application variables of the invention are handled at the network layer of the protocol and may be assigned values by an Address Space Arbitrator (ASA), the entity responsible for managing the logical network. These updates are transparent for the other layers of the protocol. Application variables allow dynamic tuning and optimization of the protocol under various operating conditions, which can be important for reliable operation on a low bandwidth physical media. Each node member of a logical network maintains a set of values for its application variables. This set is handled by the protocol's network layer, and saved in persisted storage, e.g., EEPROM. Some application variables are specific to the physical network, some are specific to the logical network. These application variables can be the same for every node on the logical network. Other application variables can be node specific. Since the variable values may be modified asynchronously, they must be treated as volatile. When a variable is used, its value can be obtained through an application interface exposed by the network layer. An exception applies to a data link layer, which obtains the operating parameters specified by application variables on every call by the network layer.

Exemplary Logical Network—Overview of Simple Control Protocol (SCP)

As mentioned, embodiments of the invention apply to protocols. An overview of SCP is provided herein. Various implementations of SCP support networks that use standard electrical wiring as the physical medium connecting the devices, e.g., the Power Line Carrier (PLC) implementation of SCP. Other SCP implementations for other physical network media such as radio frequency and infrared transmissions can also be utilized.

Figure 1:
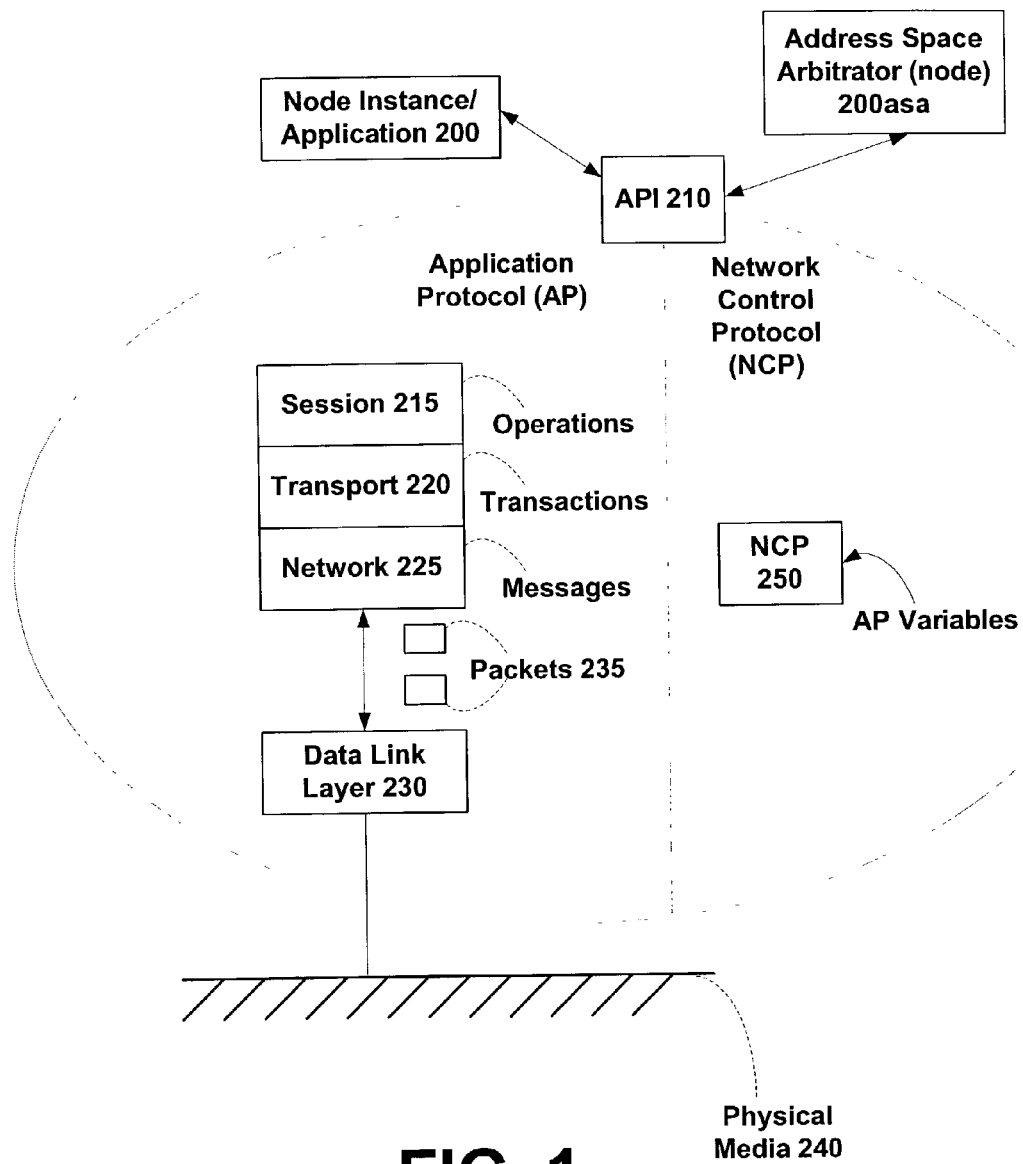
FIG. 1 is a block diagram of one example of a protocol in connection with which the invention may be implemented.

FIG. 1 illustrates a block diagram overview of an exemplary SCP stack, and exemplary description of various aspects thereof follows. SCP is a protocol that makes use of a physical medium 240, such as PLC. A protocol stack is a way to manage and organize nodes 200 in a distributed system via an API 210, or other object. A node 200 can be either a software object or a hardware object, or a combination of both. One node, the address space arbitrator 200asa, handles discovery, acquisition and maintenance of nodes on the logical network. There is one ASA 200asa per logical network.

Figure 2:
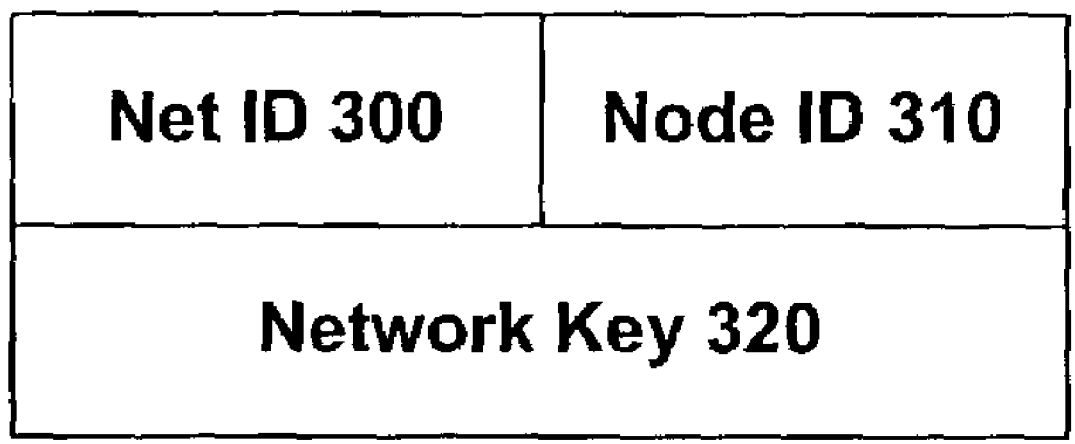
FIG. 2 is a block diagram illustrating exemplary identification information of a node on a logical network in accordance with the invention.

A protocol comprises an application protocol (AP) and a network control protocol. The application protocol side implements a session layer 215, a transport layer 220 and a network layer 225 which handle operations, transactions and messages, respectively. A data link layer 230 resides on top of the physical medium 240, and handles the message packets 235 delivered and received by the network layer 225. A protocol encrypts and decrypts communications for security purposes. Message communications make use of a logical address that includes a net ID 300, a node ID 310 and a network key 320, as illustrated in FIG. 2. These enable all nodes associated in a logical network to share a secret, which allows for each to communicate securely with other nodes on the logical network.

An SCP device is a component that uses the SCP to communicate with other devices connected to the same physical medium. SCP accommodates both "hard" and "soft" devices. A hard device is a piece of hardware such as a dimmer switch or a motion sensor. For hard devices, SCP is implemented as a set of integrated circuit (IC) chips that handle all of the protocol-level communication tasks for a device. This chipset, when added to a device, forms a communication subsystem that handles of the protocol-level communication tasks for the device.

A soft device is a software application that runs on a PC under the SCP device emulation environment. This environment emulates the communication subsystem provided by the SCP chipset and allows multiple soft devices running on the same PC to share the same channel of communications to the physical network.

At its simplest, an SCP network consists of two or more SCP devices and the physical medium connecting the devices. A network can also include other software components that run on a PC, such as the SCP to UPnP bridge, the Address-Space Arbitrator, and the Physical Network Manager.

The SCP to UPnP bridge is a special soft device that allows SCP devices to interoperate with UPnP devices. The bridge extends the full capabilities of UPnP to small devices that are not capable of implementing TCP/IP and native UPnP stacks. For example, the bridge allows the properties of an SCP device to be set by using messages sent across a TCP/IP network. All SCP device property relationships are established at the UPnP level through the bridge and propagate down to the SCP device level. The bridge also allows SCP devices to interoperate with devices that use other control protocols. If a bridge exists between those devices and a UPnP network, SCP devices can use UPnP as a common communication language.

The Address-Space Arbitrator (ASA) is another special soft device that forms and manages a logical network of SCP devices. A logical network is a group of devices that are logically separate from other devices connected to the same physical network medium. SCP can support one or more logical networks within the same physical network. For example, a physical network can include a logical network for security devices, another for lighting devices, and yet another for audio-visual equipment. Logical networks are also used in environments such as apartment buildings where adjacent apartments share the same power line. Each apartment uses its own logical network so it does not interfere with the operation of the devices in a neighboring apartment.

The Physical Network Manager is a software component that runs on a PC. It manages the connection to the physical network, allowing multiple soft devices running on the same PC to share the same connection.

An SCP device presents itself on the network as a root device with optional nested sub-devices. Each device (or sub-device) supports one or more services. A service consists of a group of related properties and actions. Properties describe the state of a service, and actions change or access the state of a service. Taken together, the sub-devices, services, properties, and actions of a device are called its device model. The SCP device model is analogous to a programming object, where an object interface provides access to a set of properties and methods that operate on and describe the state of the object.

The SCP device model is based on the UPnP device model, e.g., the device model for an SCP device is a UPnP device description that has been augmented with SCP data. As a device developer, a device model is developed for the device, creating a binary version that the device uses at runtime.

SCP devices work by exposing their properties and actions to other devices, and by using operations to access the properties and actions of other devices on the network. The operation is the fundamental unit of communication among devices. A device uses operations to set and retrieve property values on other devices, to invoke actions on other devices, and to notify other devices when the value of a property changes.

Devices use operations to accomplish many tasks, and one of the primary tasks involves implementing subscriptions. A subscription is a relationship that one device, called the subscriber, sets up between itself and a property on another device, called the publisher. After a subscription is established, the publisher sends notification messages to the subscriber whenever the value of the property changes.

Devices use subscriptions as the basis for setting up property routes. A property route is a one-way connection between two properties: a source property on a publisher device and a destination property on a subscriber device. When the value of the source property changes on publisher device, the subscriber device updates its destination property with the new value.

To illustrate how subscriptions and property routes work, consider a device that exposes a simple timer service consisting of three properties: Increment, which specifies the timer countdown increment in milliseconds; Value, which specifies the current countdown time; and Trigger, which changes from False to True when Value goes to zero. The service also has three actions: Start, Stop and SetValue. For example, if it is desired that the Timer turn on some lights when the Timer's Value property goes to zero, a third-party (for example, a configuration utility) can tell each light to subscribe to the Timer's Trigger property and create a route between that property and the light's Intensity property. Then, when Trigger property becomes True, each light's Intensity property also changes to True, and the lights come on.

One creates an SCP device by integrating the SCP communication subsystem into the device. For a hard device, this involves incorporating the SCP chipset into the circuitry of the device. For a soft device, it involves implementing code in a Windows application that takes advantage of the SCP emulation environment.

The application subsystem connects to the SCP communication subsystem through a serial peripheral interface (SPI) connection. One of the main tasks (besides creating the device model) is to implement a software interface to the SPI connection that allows the device application, running on the application processor, to communication with the communication subsystem. Code is also implemented that allows the device application to control the communication subsystem, using it to communicate with other devices on the network.

To summarize, creating an SCP device involves accomplishing the following tasks. (1) Creating the device model that defines the services, properties, and actions provided by the device, (2) Implementing code in your device application that supports the SPI connection between the application subsystem and the SCP communication subsystem and (3) Implementing code in the application-processor that interacts with the communication subsystem to communicate with other devices in the network.

Commonly-assigned copending U.S. patent application Ser. No. 09/556,279 (the '279 application), entitled "System for Networked Component Address and Logical Network Formation and Maintenance" describes a system for forming and maintaining one or more networks of devices connected to a shared media is provided. Aspects of the '279 application include processes for: (a) forming a logical network on the shared media; (b) discovering devices connected to the shared medium; (c) assigning (or acquiring) devices to a logical network; and (d) maintaining a logical network. Another aspect of the '279 application also defines a message format and protocol for communication over the shared media. The protocol uses a two-level address scheme (e.g., a logical network ID and a device ID) and defines several message types used to support the above processes and other useful features. Each device is expected to have a globally unique device ID, called the Device Serial Number (DSN).

A logical network includes an address space arbiter (ASA) and, typically, one or more devices attached to the shared media. An acquisition authority (AA), interacting with the ASA, is required to complete acquisition of a device by a logical network.

An ASA can form a logical network by selecting a possible logical network ID, when first attached to the physical media. The ASA then broadcasts a message addressed to the entire network to determine whether the possible ID is already taken. If the possible ID is not taken, the ASA adopts the ID as its logical network ID and can begin acquiring devices.

To join a logical network, a device attached to the shared media broadcasts an announce message addressed to the entire shared media. This is initiated at the request of an ASA attached to the shared media. ASAs receiving the announce message then determine whether the device is a "discovered" device. If the device is also not acquired, the AA decides whether to authorize the ASA to acquire the discovered device. If authorized, the ASA then assigns an available device ID to the device. The device ID must be unique within the logical network, but does not necessarily have to be globally unique. The ASA helps maintain the logical network by periodically sending a message to each device of the logical network and waiting for the appropriate response from that device.

One advantage is that the system provides a simple way to segment a shared media into several logical networks. In addition, the system provides an easy-to-use mechanism for connecting devices to a network suitable for the general public.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the application variables of the invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate the application variables of the invention.

Figure 3A:
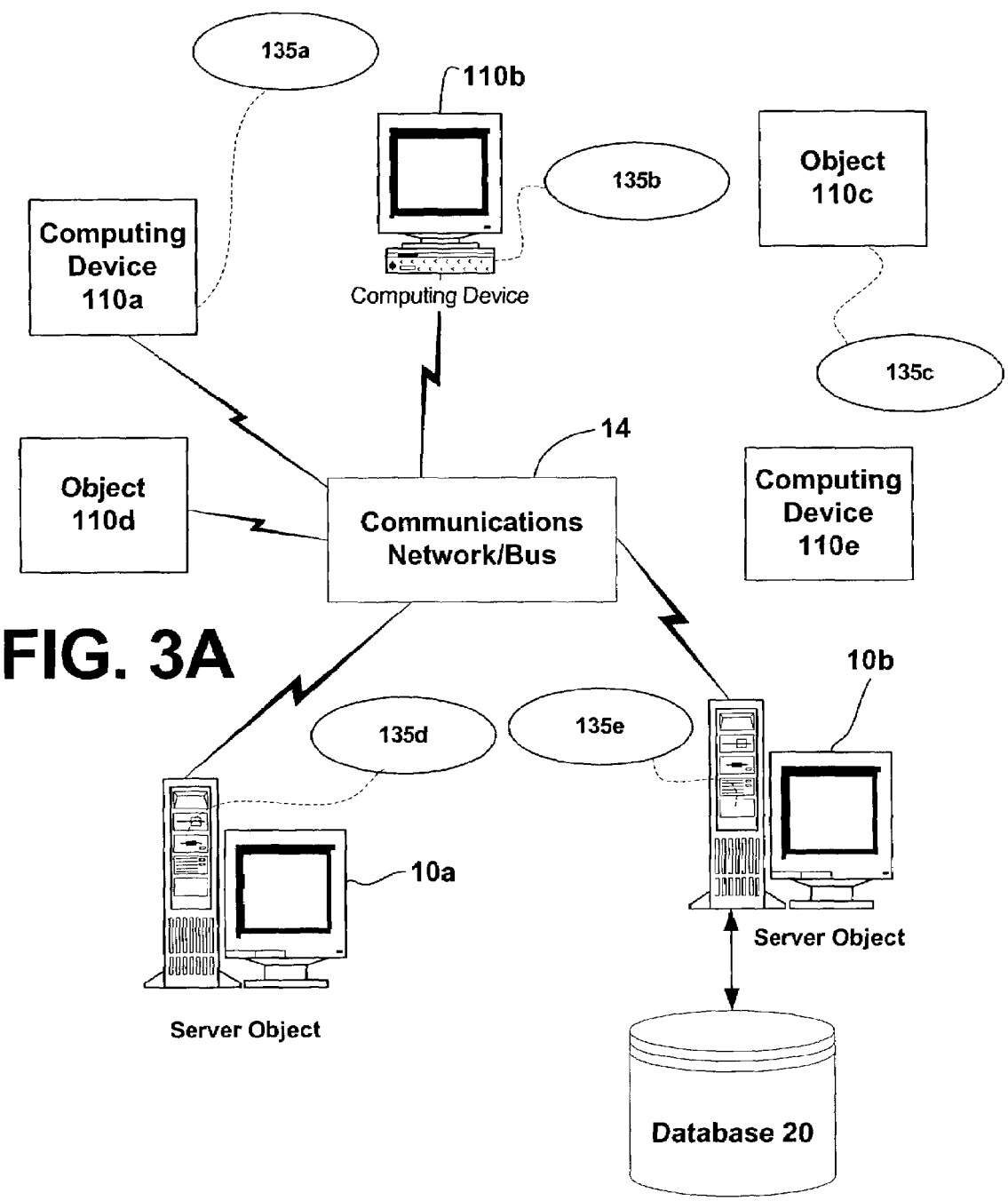
FIG. 3A is a block diagram representing an exemplary network environment having a variety of computing devices in which the present invention may be implemented.

FIG. 3A provides a schematic diagram of an e exemplary networked or distributed computing environment. The distributed computing environment comprises computing objects $10a$, $10b$, etc. and computing objects or devices $110a$, $110b$, $110c$, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 3A. In accordance with an aspect of the invention, each object $10a$, $10b$, etc. or $110a$, $110b$, $110c$, etc. may contain an application that might make use of an API, or other object, software or hardware, to request use of the application variables of the invention.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. Services that use the application variables in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since data may in practice be physically located in one or more locations, the ability to distribute services that make use of the application variables described herein is of great utility in such a system.

It can also be appreciated that an object, such as $10c$, may be hosted on another computing device $10a$, $10b$, etc. or $110a$, $110b$, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol, such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to program objects, which make use of application variables in accordance with the present invention.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 3A, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication. SCP, x10 and CEBus® are other examples of protocols used for logical network(s).

Thus, FIG. 3A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to implement logical network(s).

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing application variable(s) or data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 3B:
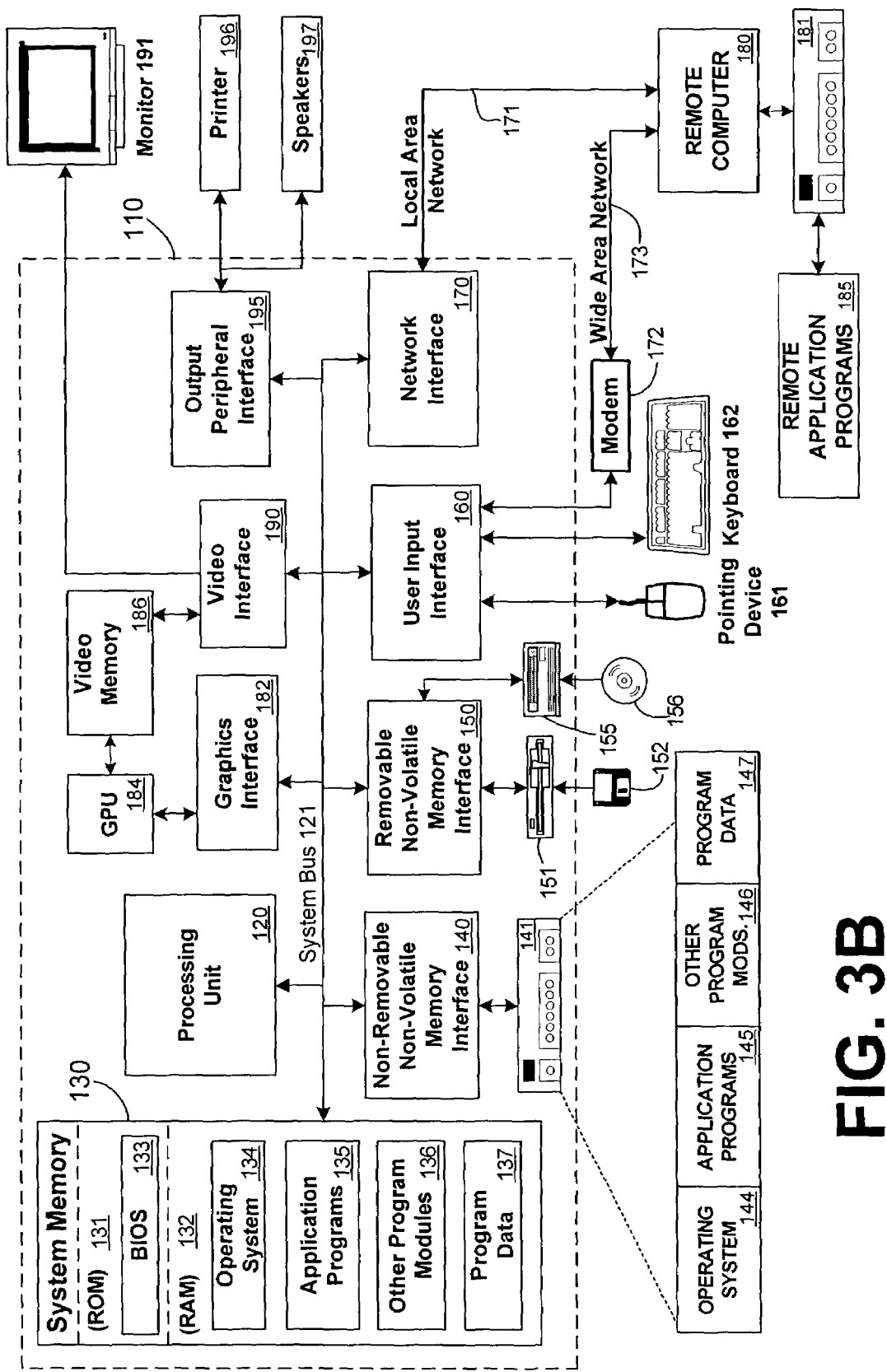
FIG. 3B is a block diagram representing an exemplary non-limiting computing device in which the present invention may be implemented.

FIG. 3B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the techniques utilizing application variables of the invention.

Although not required, the invention can be implemented via an operating system, for use by a developer of services for a device or object, and/or included within application software that operates in connection with application variables of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 3B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 3B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3B illustrates operating system 134, application programs 135, other program modules 136, and program data 137.

The computer 110 may also include other removable/non-removable, volatile/nonvolatile computer storage media. By way of example only, FIG. 3B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3B provide storage of computer readable instructions, data structures, program modules and other data for the computer 110. In FIG. 3B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3B. The logical connections depicted in FIG. 3B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central-starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

Automatic Network Optimization Using Application Variables

Application variables allow dynamic tuning and optimization of the protocol of logical network(s) under various operating conditions, which enables reliable operation in connection with low bandwidth physical media. When very high bandwidth physical media is utilized, some inefficiency can potentially be afforded because such inefficiency is hardly noticed from a performance perspective. When a lower bandwidth physical media, such as PLC, is utilized, however, with potential noise considerations as well, dynamic tuning of the network conditions is desirable. For instance, it may be the case that certain message requests from a particular client/server node combination reach the server node quickly and efficiently, however, the return responses to the client over the same physical media periodically are lost, or arrive late. In such a case, it would be desirable to dynamically determine that increased attention to the return responses is desirable. Since such inefficiencies with the return responses may occur intermittently and infrequently, it would be desirable to be able to dynamically make such determinations. What follows in the below exemplary embodiments of the invention are exemplary non-limiting application parameters that may be utilized to tune the network optimally to operating conditions.

Each node member of an SCP logical network maintains a set of values for its application variables. This set is handled by the protocol's network layer, and saved in persisted storage, typically in EEPROM. Some values of the application variables are the same for every node on the logical network, e.g., application variables relating to the physical network and application variables related to the logical network, whereas other values of the application variables can be node-specific.

Since the variable values may be modified asynchronously, they are treated as volatile; thus, when a variable is used, the value of the variable is obtained, e.g., by polling, through an application interface exposed by the network layer. An exception to this general rule resides in the data link layer, situated below the network layer in the Open Systems Interconnection (OSI) model, for instance, which obtains some operating parameters on every call by the network layer.

OSI is a standard description or reference model for how messages should be transmitted between any two points in a telecommunication network. Its purpose is to guide product implementers so that their products will consistently work with other products. The reference model defines seven layers of functions that take place at each end of a communication. Although OSI is not always strictly adhered to in terms of keeping related functions together in a well-defined layer, many if not most products involved in telecommunication make an attempt to describe themselves in relation to the OSI model.

In accordance with the invention, the network control protocol handler, a component of the network layer, handles the servicing of the application variables as follows: (1) the network control protocol handler handles persistence of the variables value in storage, (2) the network control protocol handler provides the value of any variable to other protocol layers through an application interface, (3) the network control protocol handler accepts new variables values at the time the device is assigned to a logical network by the ASA, e.g., through a NetAssign message, (4) the network control protocol handler accepts and acknowledges new variables values when instructed so by the ASA, e.g., through a WriteVars message and (5) provides the values of its variables when asked by the ASA, e.g., through a ReadVars message.

The ASA updates application variables when a node is assigned to its logical network. The ASA can pass the variables through a NetAssign message along with the logical network information. This allows each node new to a network to become online with the right set of parameters.

The ASA also updates application variables when the network conditions have changed such that the variables need to be updated. The ASA can broadcast new application variables to all nodes on the logical network through a WriteVars message and each node acknowledges the message, e.g., using an exponential back off so that the communication channel is not flooded.

The ASA can use unicast ReadVars and WriteVars messages to verify and update nodes that may have missed the broadcast update, e.g., for nodes that were offline at the time of the update.

As mentioned above, operation of the protocol stack depends upon a number of persistent variables, remembered over power and reset cycles, which control protocol timing. These variables can have numeric identifiers, such as the exemplary set of variables listed in Tables VI, VII, VIII and IX below. Typically, a central facility, like the ASA, coordinates the application variables across all nodes within a given logical network. If a variable is changed for the network, the ASA continues to monitor for devices coming online that are to be updated with the current values. Mismatching application variable values can lead to a dysfunctional logical network.

Thus, when the ASA assigns network membership to a device according to the invention, it may reset any application variables. Afterwards, application variables can be changed, but care is taken to keep the values consistent across all nodes in a network. Application variables can be changed using NetAssign message(s). Application variables can be read/changed using Read/Write variable(s).

A set of diagnostic counters can be read using Read variable's Request/Response network control protocol (NCP) messages for the purpose of tuning the network. The NCP is a media dependent protocol and is used to communicate across the entire physical network. The primary purpose of the NCP is to support the formation and maintenance of logical networks, while the purpose of the application protocol (AP) is to support peer-to-peer communication between nodes within a particular logical network.

Figure 4:
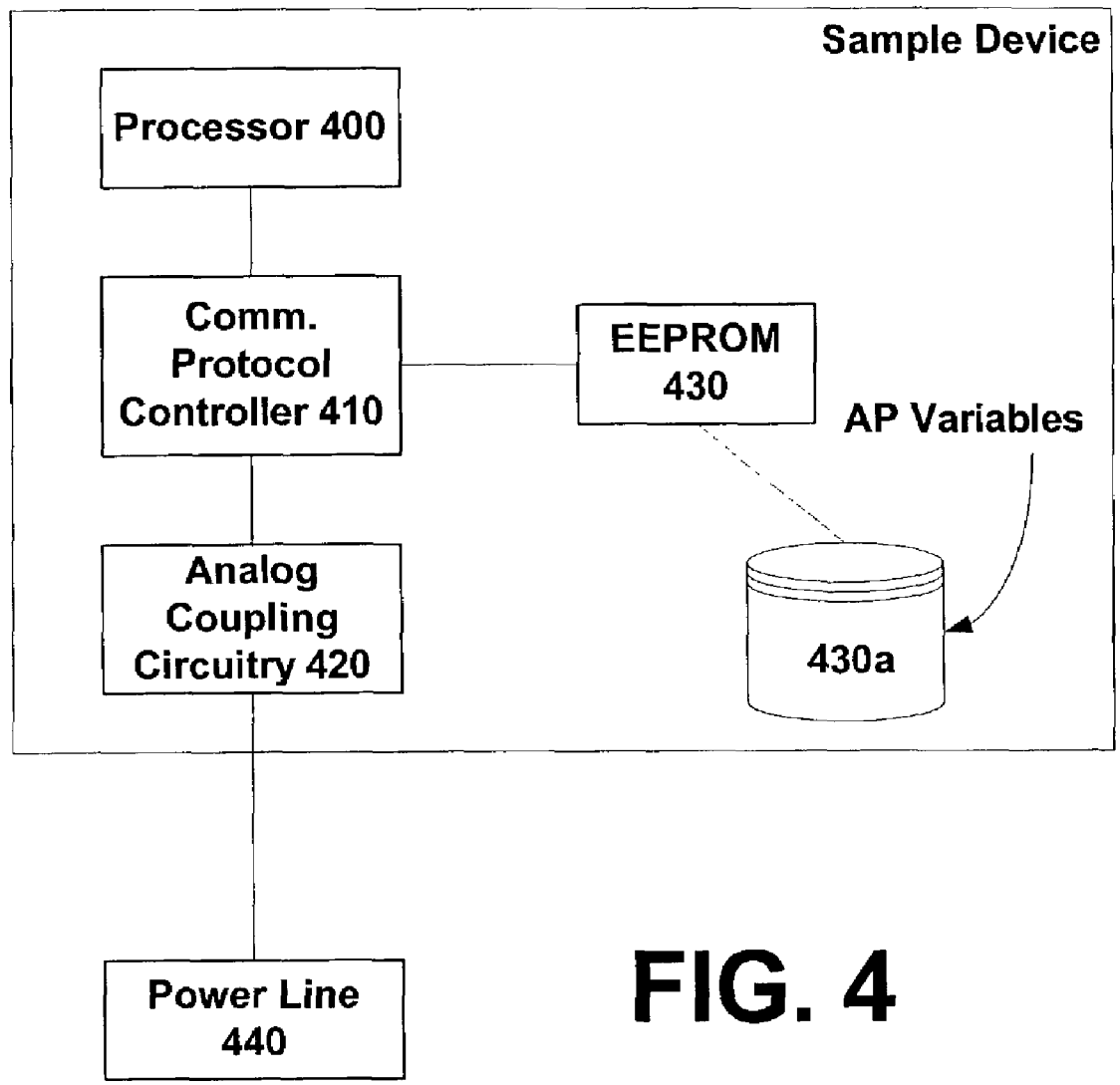
FIG. 4 is a block diagram of an exemplary device having application variables in accordance with the invention.

Application variables are thus network tuning parameters for a logical network. Application variables can be distributed in a couple of different ways. Application variables can be set during a node acquisition step. Alternatively, application variables can be set by default into a device or object. For instance, an exemplary embodiment of a hypothetical device communicating over PLC is illustrated in FIG. 4. The device can have a processor 400 and a communications protocol controller chip 410, such as Itran®'s IT800 chip, which is "SCP ready." Chip 410 is connected to analog coupling circuitry 420, which in turn is connected to a power line 440. Application variables 430a can be burned into EEPROM 430 in accordance with the invention. Any can be defaulted by the manufacturer. In this regard, in one embodiment, the application variables comprises a variable length table maintained by the network layer. This alternate option enables manufacturers a chance to write default variables.

As mentioned, some application variables are specific to the logical network, some are specific to the physical network and some are specific to particular nodes. Application variables can be dynamically changed during optimization of the system. The concepts behind application variables may be more broadly extended to protocol variables, some of which are described below.

In one non-limiting embodiment, an application variables element in a network membership assignment message and an application variables access message is a variable-length list of up to 32 variables, prefixed by a header, which consists of one or more bytes, interpreted as a list of two-bit nibbles. Each nibble value in the header represents the size of the protocol variable in the list (in the same order). The variable values list starts on the first byte following the header, and is interpreted as a list of four-bit nibbles. Each value is composed of 1, 2 or 4 nibbles from the stream, which can be interpreted in big-endian format, as defined by the header. It is noted that the variables list may be empty if the first nibble in the header is 0.

AP variables can be updated in three main ways in accordance with the invention. First, AP variables can be set by the manufacturer by default, as mentioned. Second, the ASA can update AP variables at the time of node acquisition via a NetAssign message. A NetAssign HiSec message exists for high security communications. Third, the ASA can update AP variables during network tuning via a Write VarsReq. Message.

The NCP_ReadVarsReq message is a protocol variables read request. A requesting device, typically an ASA, sends the NCP_ReadVarsReq message to request that the targeted node return the protocol variables requested via an NCP_Read-VarsResp message. Fields of the NCP_ReadVarsReq message include the following from Table I.

TABLE I

Fields of the NCP_ReadVarsReq message

| Name | Description | Octets |
|---|---|---|
| NCP_NetTime | Network time in milliseconds (in the clear) | 4 |
| NCP_ReqVarsRequested | Protocol variables requested | 0.5 |
| NCP_ReqTargetNodeId | Node ID of target device | 1.5 |
| NCP_ReqCount | Request counter (sent back in a corresponding response message) | 2 |
| NCP_MAC | Message authentication code (covers the NCP message type followed by all the above fields) | 4 |

The NCP_ReqVarsRequested field has one of the following values of Table II:

TABLE II

Values of the NCP_ReqVarsRequested field

| NCP_ReqVarsRequested | Protocol variables requested |
|---|---|
| 0 | application variables |
| 1 | data link configuration variables1 |
| 2 | data link configuration variables2 |
| 8 | Physical layer diagnostic counters (read only) |
| 9 | Data Link layer diagnostic counters |
| 10 | Media Access Control diagnostic counters |
| 11 | Network layer diagnostic counters |

The targeted node ignores the NCP_ReadVarsReq message if it is accidentally sent with an NCP_ReqTargetNodeId parameter with a value of the broadcast address (zero).

To allow correlation between requests and responses, the NCP_ReqCount parameter is a value the device should return in the corresponding NCP_ReadVarsResp message.

If the requesting device does not receive a response within a media-specific period of time, the requesting device missed the response or the targeted device did not receive the request. In this case, the requesting device makes a media-specific number of retry attempts prior to assuming an error situation exists.

The NCP_ReadVarsResp message is a protocol variables read response. A device sends the NCP_ReadVarsResp message in response to any NCP_ReadVarsReq message that it receives. Fields of the NCP_ReadVarsResp message include the following from Table III.

TABLE III

Fields of the NCP_ReadVarsResp message

| Name | Description | Octets |
|---|---|---|
| NCP_NetTime | Network time in milliseconds (in the clear) | 4 |
| NCP_ReqVarsRequested | Protocol variables requested (from the request message) | 0.5 |
| NCP_SourceNodeId | Node ID of replying device | 1.5 |
| NCP_ReqCount | Request counter (from the request message) | 2 |
| NCP_VarsValues | Protocol variables values stream | up to 64 |
| NCP_MAC | Message authentication code (covers the NCP message type followed by all the above fields) | 4 |

The NCP_VarsValues field includes a header followed by the actual variables. Each 2-bit value in the header specifies the size of the corresponding protocol variable. The following table III-A lists the possible values of each 2-bit value and that value's significance.

TABLE III-A

Protocol Variables Values

| Value | Significance |
|---|---|
| 1 | Corresponding variable is 4-bits in length. |
| 2 | Corresponding variable is 1 byte in length. |
| 3 | Corresponding variable is 2 bytes in length. |
| 0 | Identifies end of header. (Subsequent bytes contain actual variable data.) |

For example, if the NCP_VarsValues field is 0x56C0ABCDEF023, there would be a total of five variables in the stream with decimal values of: 10, 11, 12, 222 and 61,475 respectively.

The NCP_WriteVarsReq message is a protocol variables write request. A requesting device, typically an ASA, sends the NCP_WriteVarsReq message to request that the targeted node updates its protocol variables to the values passed in the message. Each targeted node replies with an NCP_WriteVarsResp message upon successfully updating its variables. This message may be broadcast such that all nodes on the logical network are targeted at once. Fields of the NCP_WriteVarsReq message include the following from Table IV.

TABLE IV

Fields of the NCP_WriteVarsReq message

| Name | Description | Octets |
|---|---|---|
| NCP_NetTime | Network time in milliseconds (in the clear) | 4 |
| NCP_ReqVarsRequested | Protocol variables requested | 0.5 |
| NCP_ReqTargetNodeId | Node ID of target device | 1.5 |
| NCP_ReqCount | Request counter (sent back in a corresponding response message) | 2 |
| NCP_VarsValues | Protocol variables values stream | up to 64 |
| NCP_MAC | Message authentication code (covers the NCP message type followed by all the above fields) | 4 |

In one embodiment, only application variables can be written according to the NCP_WriteVarsReq message. To allow correlation between requests and responses, the NCP_ReqCount parameter is a value a device returns in the corresponding NCP_WriteVarsResp message. If the requesting device does not receive a response within a media-specific period of time, it may be presumed the requesting device missed the response or the targeted device did not receive the request. In this case, the requesting device makes a media-specific number of retry attempts prior to assuming an error situation exists.

Generally, read messages and write messages occur on a relatively frequent basis. Write messages can be unicast or broadcast in accordance with the invention. Additionally, generally, only the minimum number of application variables that are needed to make a determination are used for efficiency.

An NCP_WriteVarsResp message is a protocol variable write response. A device sends the NCP_WriteVarsResp message in response to a NCP_WriteVarsReq message that it receives. Fields of the NCP_WriteVarsResp message include the following from Table V.

TABLE V

Fields of the NCP_WriteVarsResp message

| Name | Description | Octets |
|---|---|---|
| NCP_NetTime | Network time in milliseconds (in the clear) | 4 |
| NCP_ReqVarsRequested | Protocol variables requested (from the request message) | 0.5 |
| NCP_SourceNodeId | Node ID of replying device | 1.5 |
| NCP_ReqCount | Request counter (from the request message) | 2 |
| NCP_MAC | Message authentication code (covers the NCP message type followed by all the above fields) | 4 |

When the request message is broadcast, replying nodes back off their reply up to a delay amount, defined by a delay application variable, eScpAPVars_Net_NCPTxHoldoffDelay.

The following variables and corresponding non-limiting default values for an exemplary SCP/PLC implementation are illustrated in Tables VI, VII, VIII, IX and X corresponding to data link layer variables, network time synchronization variables, network presence variables, network layer variables and transport layer variables, respectively. Unless stated otherwise, times are in seconds.

TABLE VI

Data Link Layer

| ID | Name | Time |
|---|---|---|
| 20 | Blocked Transmit Timeout Ms | 1500 |
| 21 | Broadcast Burst Count | 0 (implies send once in robust mode) |
| 22 | ACK Retry Count | 3 |

TABLE VII

Network Time Synchronization

| ID | Name | Time |
|---|---|---|
| 1 | Poll Holdoff Delay Ms | 2000 |
| 2 | Master Holdoff Delay Ms | 1000 |
| 3 | Query Poll Time | 5 |
| 4 | Master Declaration Wait | 20 |
| 5 | Subordinate Declaration Wait | 150 |
| 6 | Declaration Poll Time | 60 |
| 7 | Master Response Wait | 8 |
| 8 | Maximum Message Skew | 5 |

TABLE VIII

Network Presence

| ID | Name | Time |
|---|---|---|
| 9 | Slow Node Presence Base Id | 1024 |
| 10 | Fast Node Presence Refresh | 10 |
| 11 | Fast Node Presence Timeout | 25 |
| 12 | Slow Node Presence Refresh | 60 |
| 13 | Slow Node Presence Timeout | 150 |

TABLE IX

Network Layer

| ID | Name | Time |
| --- | --- | --- |
| 14 | Message Assembly Timeout | 3 |
| 15 | NCP Transmit Holdoff Delay | 10 |

TABLE X

Transport Layer

| ID | Name | Time |
| --- | --- | --- |
| 16 | Max Request Retry Count | 3 |
| 17 | Reply Wait Timeout Ms | 1000 milliseconds |
| 18 | Max Reply Retry Count | 4 |
| 19 | Reply ACK Wait Timeout Ms | 1000 milliseconds |

In general, application variables in accordance with the invention can be thought of as relating to any one or more of the following concepts pertaining to network conditions: data link, time, presence, network and transport. Any one or more values from application variables can be determined to calculate the optimal conditions for the network operation, i.e., path qualities can be observed per addressor/addressee and accumulated across the network in order to dynamically determine the best way to communicate data from one point in the network to another point. For instance, weak transmitters of data can be afforded specialized treatment, for instance, by using a more reliable modulation type applied to the data transmission. Weak receptors can be treated in a customized manner as well. In one embodiment NCP 250 effects distributed network management in accordance with a high level view of what is occurring across the network.

Application variables relating to timing can apply to a variety of communications and parameters. For instance, application variables include adaptive back off parameters, which are timing windows for communications. Application variables include thresholds for certain conditions, such as when to timeout on missing packets.

Network time synchronization is also relevant to the control process. SCP devices use a network time synchronization feature to detect and ignore "replay" messages. All SCP application protocol messages include the network time indicating when the messages were sent. SCP sends this time unencrypted and includes the time in the encryption key. If there is too great a difference between the send time and the receiver's idea of the current network time, SCP ignores the message.

SCP devices that are members of a logical network are in one of three time synchronization modes: Master, Subordinate and Unlocked. The Master mode uses a network time reference for other SCP devices. The Subordinate mode locks onto the master SCP device for network time. The Unlocked mode is not synchronized, neither in Master nor Subordinate mode.

Regardless of the operating mode, devices synchronize their network time to the time provided in a valid NetTimeAssert message received for their associated network. SCP tunnels this message through the application protocol network layer 225 to enable jamming protection against replay attack.

The following non exhaustive, non-limiting protocol variables are used with the following non-limiting default values.

TABLE XI

Exemplary Network Time Variables

| Name | Default (in seconds) |
| --- | --- |
| NetTimePollHoldoffDelayMs | 5000 ms |
| NetTimeMasterHoldoffDelayMS | 1000 ms |
| NetTimeQueryPollTime | 8 |
| NetTimeMasterDeclWait | 20 |
| NetTimeSubordinateDeclWait | 300 |
| NetTimeDeclPollTime | 120 |
| NetTimeMasterRespWait | 12 |
| NetTimeMaxMessageSkew | 6 |

A time master node can be any node on the network, and in one implementation is the first node to declare itself on the network. Each node synchronizes its time to a network time declared by the time master node. This network time is combined with the source node ID to create a unique number for every message, which changes every few milliseconds. The network time declared by the time master provides protection against "replay attack," namely against someone or something attempting to record and replay message communications on the network attempting to use the same message key.

With respect to the use of the exemplary network time variables of Table XI, if a device in Master mode receives a valid NetTimeAssert message from a device whose address is lower, it switches into Subordinate mode.

If a device in Master mode receives a NetTimeAssert message from a device whose address is higher, it reasserts its mastership by immediately sending out its own NetTimeAssert message.

Devices always synchronize their network time to the time provided in a valid NCP_NetTimeAssert message for their network, regardless of current operating mode. So before reasserting mastership, a device synchronizes its network time to the time just received from the conflicting master declaration. Thus there should not be any additional time discrepancies due to the mastership change.

If a device is in Subordinate mode and it has been more than NetTimeSubordDeclWait plus a random time up to NetTimeMasterHoldoffDelay since the device received the last NetTimeAssert message, the device switches into Master mode. If multiple devices do this simultaneously, mastership eventually settles out to the device with the lowest address.

If a device is in Subordinate mode and it receives a NetTimeQuery message, and the master does not respond within NetTimeMasterRespWait plus a random time up to NetTimeMasterHoldoffDelay, the device switches into Master mode. This causes a NetTimeAssert message to be sent and prevents the querying device (a newcomer on the network) from asserting itself as master with an unsynchronized network time, if the time master just went offline.

The NetTimeMaxMessageSkew defines the maximum allowed+/+ offset between the time stamp on an incoming secure message and a device's synchronized network time. A device ignores any secure messages with a time stamp outside of this window.

Simple Control Protocol wraps AP network layer messages in an encryption envelope with the following components: the message time, the message payload and the message authentication code. The Message time is the 32-bit logical network time (in milliseconds) at the source node when the message was sent. It is not encrypted. Simple Control Protocol refreshes this value and re-encrypts the rest of the message every time it sends a message. The message payload is the AP network layer message, which is encrypted. The 32-bit message authentication code (MAC) is for the message payload only, and it is encrypted.

In one embodiment, Simple Control Protocol encryption uses a stream cipher that is reinitialized for each message. The key for the cipher is a concatenation of the 128-bit network key, the 32-bit message time, and the source device address (zero-padded 16-bit network ID and node ID), in that order.

Simple Control Protocol uses the network time for two purposes. First, the network time randomizes the data sent on the physical medium so that identical message payloads look different each time they are sent. Second, messages received outside of a narrow time window (for example, 2-3 seconds) are invalid, thwarting replay attacks. This implies that the logical network time needs to be synchronized closely enough to allow messages to get through, and thus requires periodic re-synchronization.

Aspects of presence tracking using network time application variables are disclosed in commonly assigned copending U.S. patent application Ser. No. XX,YYY,ZZZ (Keep Alives Optimization), herein incorporated by reference, and thus not addressed in detail herein.

The address space is separated into two groups of devices that time out quickly or slowly, respectively. The ASA controls the operating mode and the quick and slow devices using AP variables. For more detailed information, see the exemplary protocol variables of Tables VI through X.

Figure 5A:
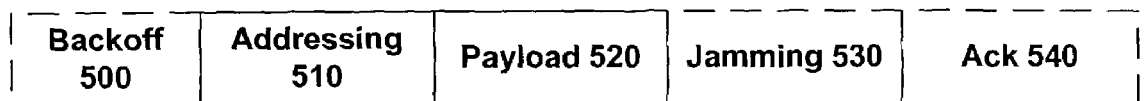
FIG. 5A illustrates exemplary non-limiting packet timing for an embodiment of the invention.

With respect to the data link layer, a collision avoidance mechanism can also be implemented. For instance, if a packet is unable to transmit within a predetermined period of time, the packet can be abandoned without further penalty. For instance, as illustrated in FIG. 5A, in an exemplary non-limiting embodiment, a packet time window takes on the potential format of a backoff window 500, an addressing information window 510, a payload window 520, a jamming window 530 and an ack window 540. The backoff window 500 determines how long to wait to send a packet before giving up on sending the packet at all, depending upon quality and amount of network traffic. Thus, when transmitting a packet in the data link layer, this timeout variable helps determine how long is too long to wait to transmit. Additionally, as alluded to previously, in the unicast case, application variables can help determine how many times to retry in the event an ack packet is not received back from a unicast packet.

With reference to the variables in Table VI above, in the case of a broadcast packet to all nodes, there is no acknowledgment from any of the nodes that they have received the packet, and thus accordingly, the broadcast burst count defines the number of times to send the packet, more than once, based upon the conditions of the network and a likelihood that the nodes will receive the packet. The Ack retry count determines how many times to re-send a packet without having received an ack packet before giving up on the packet entirely.

With respect to the network layer, application variables also help determine NCP holdout delay or a message assembly timeout condition. For instance, if a message requires a reply, certain nodes will hold off, and stagger replies.

With respect to the transport layer, application variables help determine time out conditions and number of retries before dropping a message. For instance, if no reply message is received, the transport layer variables help to determine how much time should pass before retrying the message, and how many times to retry.

Figure 5B:
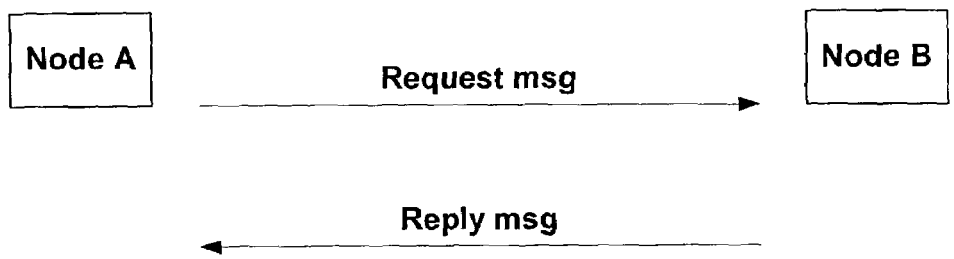
FIG. 5B is a first exemplary node communication scenario illustrating aspects of communications in a logical network in accordance with the invention.
Figure 5C:
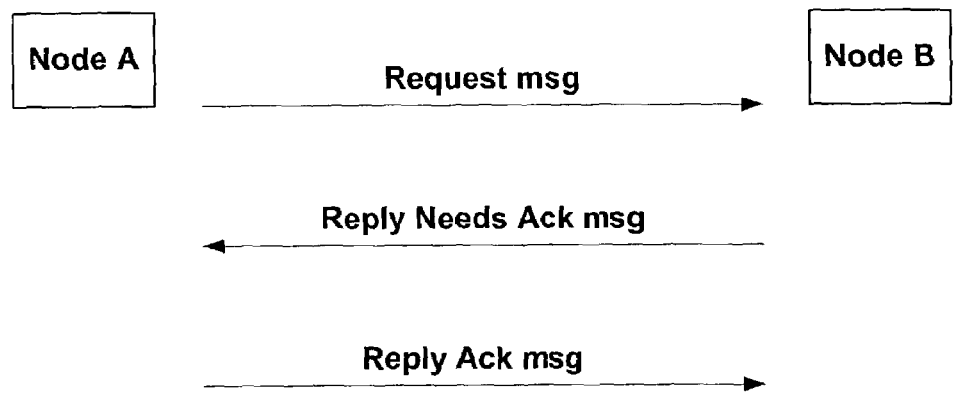
FIG. 5C is a second exemplary node communication scenario illustrating aspects of communications in a logical network in accordance with the invention.

Application variables can help make determinations with respect to the following scenario illustrated in FIG. 5B, wherein first a node A sends a request message to node B, then node B sends a reply message back to node B. In FIG. 5C, first a node A sends a request message to node B, then node B sends a reply ack needed message back to node B and then node B waits for a reply ack message from node A. Application variables can determine how long to wait before sending any one or more of the request, reply and reply ack messages again, e.g., how many times the cycle is attempted before discontinuing the attempt.

Thus, optimization of a logical network in accordance with the invention involves taking diagnostic counter values as inputs and making determinations with respect to limited bandwidth, degraded signal quality on certain paths, amount of activity, signal quality and number and kinds of nodes. One constraint on such a system is that an infinite number of retries is not available, i.e., after a certain number of retries, it must be assumed that the message is unable to be delivered in order to continue with other aspects of the system eventually.

Figure 6:
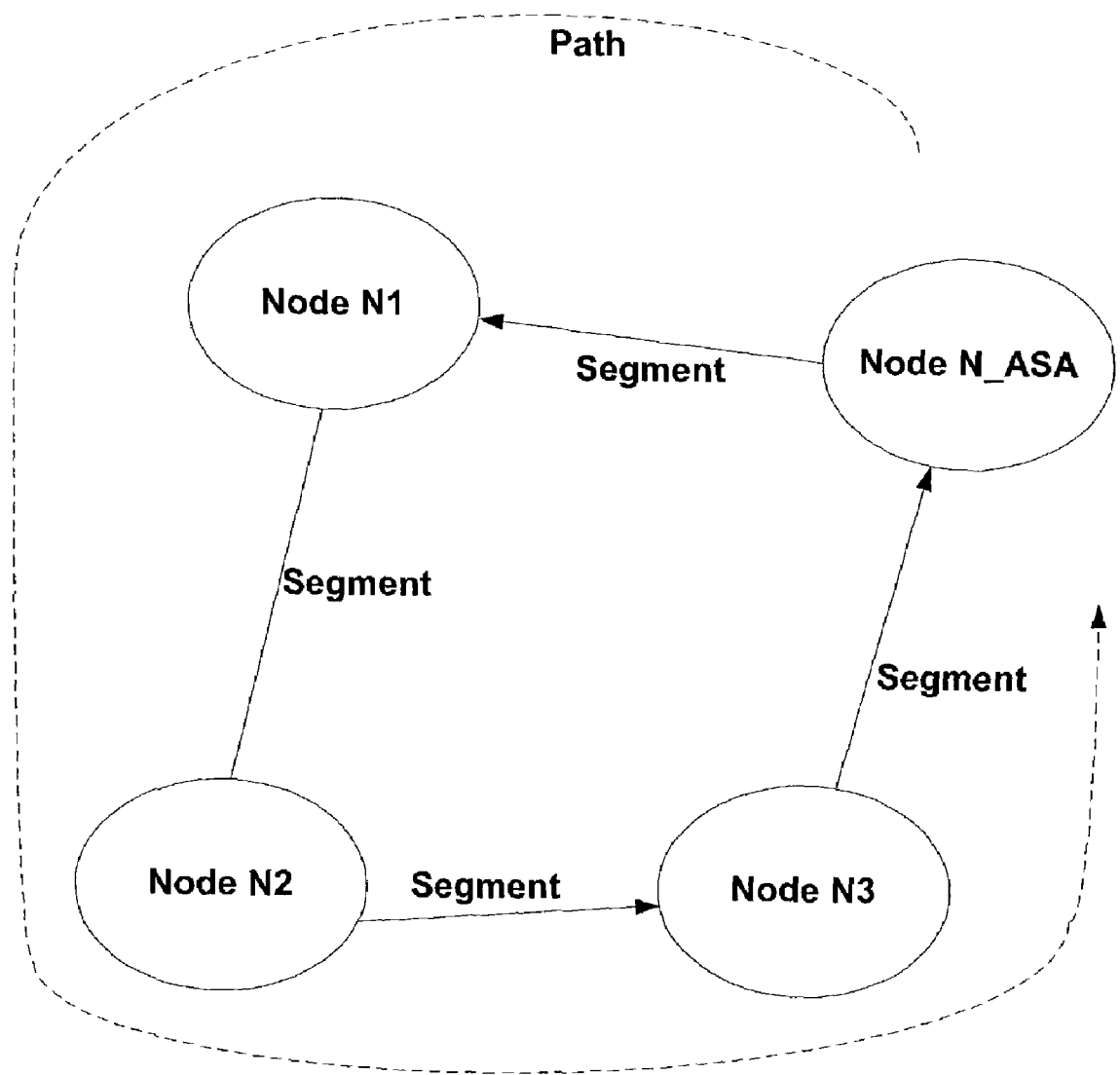
FIG. 6 illustrates an exemplary non-limiting implementation of the invention that determines path qualities through logical node test path operation.

FIG. 6 illustrates an exemplary implementation of the invention that determines path qualities through logical node test path operation. The ASA node N_ASA sends messages through various combinations and permutations of nodes N1, N2, N3, etc. and makes determinations and/or cross-correlations with respect to which node paths are good and which node paths are of poor quality. In this regard, each node knows whether or not it receives a message, and the signal quality for the segment. A chart can be built in accordance with such a procedure that describes the point to point segment quality between any two nodes. With reference to the chart, network conditions can be optimized for any two node point communications, and such test path operation can be dynamically updated in accordance with current network conditions. The rate of network traffic for each node can also be taken into account in accordance with the invention. A distinction can also be made with respect to noise correction where the correct data is difficult to decipher vs. error correction where the data is incorrect.

While some exemplary embodiments herein are described in connection with software residing on a computing device, one or more portions of the invention may also be implemented via an operating system, application programming interface (API) or a "middle man" object, hardware, firmware, such that application variables may be included in, supported in or accessed via all of NET's languages and services, and in other distributed computing frameworks as well. There are thus multiple ways of implementing the present invention, e.g., an appropriate API, tool kit, driver code, operating system, standalone or downloadable software object, etc. which enables applications and services to use the application variables to achieve more complex functionality and more efficient use of lower bandwidth media. The invention contemplates the use of the invention from the standpoint of an API (or other software object), as well as from a software or hardware object that communicates in connection with application variables. Thus, various implementations of the invention described herein have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to implement application variables in a logical network. Thus, the techniques for providing automatic network optimization with application variables in accordance with the present invention may be applied to a variety of applications and devices. For instance, the algorithm(s) and hardware implementations of the invention may be applied to the operating system of a computing device, provided as a separate object on the device, as part of another object, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the application variables of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for automatically tuning a network having a protocol and a plurality of nodes forming a logical network, comprising:

receiving at least one value for at least one application variable, the at least one application variable representative of a network tuning parameter for the logical network and the at least one application variable additionally corresponding to a network time synchronization application variable, wherein at least one node of the plurality of nodes is configured to use the at least one value to detect and ignore replay messages; and altering, based upon said at least one value corresponding to the network time synchronization application variable, at least one of protocol timing and network behavior relating to the at least one node of said plurality of nodes in said network.

2. A method according to claim 1, wherein said at least one application variable includes at least one of (A) a variable corresponding to a data link layer of the protocol, (B) a variable corresponding to network time synchronization of the logical network, (C) a variable corresponding to a network layer of the protocol and (D) a variable corresponding to a transport layer of the protocol.

3. A method according to claim 2, wherein a node of the network is in one of three time synchronization modes including a master mode, a subordinate mode and an unlocked mode, wherein the master mode uses a network time reference for other nodes, the subordinate mode locks onto a master node for a network time and the unlocked mode is not synchronized.

4. A method according to claim 2, wherein a node synchronizes its network time to a time provided in any network time assert message received for its associated network.

5. A method according to claim 2, wherein a variable corresponding to network time synchronization of the logical network includes at least one of a variable for (A) Poll Holdoff Delay, (B) Master Holdoff Delay, (C) Query Poll Time, (D) Master Declaration Wait, (E) Subordinate Declaration Wait, (F) Declaration Poll Time, (G) Master Response Wait and (H) Maximum Message Skew.

6. A method according to claim 2, wherein a variable corresponding to the network layer of the protocol includes at least one of a variable for (A) Slow Node Presence Base Id, (B) Fast Node Presence Refresh, (C) Fast Node Presence Timeout, (D) Slow Node Presence Refresh and (E) Slow Node Presence Timeout.

7. A method according to claim 2, wherein a variable corresponding to the network layer of the protocol includes at least one of a variable for (A) Message Assembly Timeout and (B) Network Control Protocol Transmit Holdoff Delay.

8. A method according to claim 2, wherein a variable corresponding to the transport layer of the protocol includes at least one of a variable for (A) Max Request Retry Count, (B) Reply Wait Timeout, (C) Max Reply Retry Count and (D) Reply Acknowledgment Wait Timeout.

9. A method according to claim 2, wherein a variable corresponding to the transport layer of the protocol determines at least one of (A) time out conditions after dropping a message and (B) how long to wait before re-sending at least one of a request, reply and reply acknowledgement.

10. A method according to claim 2, wherein a variable corresponding to the data link layer of the protocol determines at least one of (A) backoff timeout, (B) acknowledgment retry count and (C) broadcast burst count.

11. A method according to claim 1, wherein said at least one application variable includes at least one of (A) a variable corresponding to a data link layer, (B) a variable corresponding to a network layer and (C) a variable corresponding to a transport layer.

12. A method according to claim 11, wherein said at least one variable corresponding to a network layer includes at least one variable corresponding to (A) a variable corresponding to time and (B) a variable corresponding to presence.

13. A method according to claim 1, wherein each node tracks the presence of all other nodes in the network by way of at least one variable corresponding to the network layer.

14. A method according to claim 1, wherein said at least one application variable is persistently stored.

15. A method according to claim 1, wherein the at least one application variable is handled at a network layer of the protocol.

16. A method according to claim 1, further comprising:
assigning values by an Address Space Arbitrator (ASA), wherein the ASA is an entity responsible for managing the network.

17. A method according to claim 16, further comprising handling the servicing of at least one application variable by a network control protocol handler, a component of a network layer, wherein said handling includes at least one of (A) handling by the network control protocol handler the persistence of a value of an application variable in storage, (B) providing by the network control protocol handler the value of a variable to a protocol layer other than the network layer through an application interface, (C) accepting by the network control protocol handler a new value of an application variable at the time a device is assigned to a logical network by an ASA, (D) accepting and acknowledging by the network control protocol handler a value of a new variable when instructed by the ASA and (E) providing a value of an application variable when asked by the ASA.

18. A method according to claim 16, wherein the ASA updates the at least one application variable when a node is assigned to its logical network.

19. A method according to claim 16, wherein the ASA broadcasts the at least one application variable to all nodes on the logical network through a Write message and each node acknowledges the message.

20. A method according to claim 16, wherein the ASA unicasts Read and Write variable messages to verify and update a node.

21. A method according to claim 1, wherein said altering is transparent to a layer other than a network layer of the protocol.

22. A method according to claim 1, wherein said altering includes dynamically tuning and optimizing the protocol based upon a determination that a specific operating condition exists in the network.

23. A method according to claim 22, wherein said specific operating condition includes at least one of (A) low bandwidth operation of the physical medium of the network, (B) potential noise (C) a dynamic determination that there is a weak transmitter node (D) a dynamic determination that there is a weak receptor node, (E) degraded signal quality on a communications path, (F) amount of activity on the network and (G) a specific combination of number and kinds of nodes.

24. A method according to claim 23, wherein said at least one application variable includes at least one of (A) an adaptive back off parameter, (B) a timing window for network communications and (C) a threshold for a determination that there is at least one of said specific operating conditions.

25. A method according to claim 1, wherein said altering includes cross-correlating with respect to the node segments of the network which node paths are of good quality and which node paths are of poor quality.

26. A method according to claim 25, wherein said cross-correlating includes taking into account the rate of network traffic.

27. A method according to claim 1, wherein each node member of the logical network maintains a set of at least one value of least one application variable associated with the node member.

28. A method according to claim 27, wherein the set of at least one value is handled by a network layer of the protocol, and saved in persisted storage.

29. A method according to claim 27, wherein the at least one value of at least one application variable is one of (A) specific to the physical network, (B) specific to the logical network and (C) specific to a node on the logical network.

30. A method according to claim 1, wherein the at least one value is modified asynchronously.

31. A method according to claim 1, wherein said receiving the at least one value includes receiving said at least one value through an application interface exposed by a network layer of the protocol.

32. A method according to claim 31, wherein with respect to a data link layer of said protocol, said receiving at least one value includes receiving at least one value of at least one application variable on every call to the application interface.

33. A method according to claim 1, wherein the associated protocol is one of SCP, x10 and CEBus®.

34. A method according to claim 1, wherein a physical network underlying the logical network is one of a power line carrier network, a radio frequency network and an infrared transmission network.

35. A method according to claim 1, wherein when the values of the application variables are altered, further comprising ensuring that the values are consistent across all nodes in the network.

36. A method according to claim 1, wherein said at least one application variable at least one of (A) is set during a node acquisition step, (B) is set by default into one of a device and object and (C) is changed during optimization of the network dynamically.

37. A method according to claim 36, wherein when said at least one application variable is set by default into a one of a device and object, a subset of said at least one application variable is left blank.

38. A method according to claim 1, wherein the at least one application variable comprises a variable length table maintained by the network layer.

39. A method according to claim 1, wherein the at least one application variable is at least one of (A) logical network specific, (B) specific to a particular physical network underlying the logical network and (C) node specific.

40. A method according to claim 1, wherein said at least one application variable is at least one protocol variable.

41. A method according to claim 40, further comprising receiving a network control protocol read variables request message requesting reading of at least one protocol variable.

42. A method according to claim 41, wherein fields of the network control protocol read variables request message include at least one of (A) Network time, (B) Protocol variables requested, (C) Node ID of target device, (D) Request counter, and (E) Message authentication code.

43. A method according to claim 41, further comprising receiving a network control protocol read variables response message responding to a network control protocol read variables request message.

44. A method according to claim 43, wherein fields of the network control protocol read variables response message include at least one of (A) Network time, (B) Protocol variables requested, (C) Node ID of replying device, (D) Request counter, (E) Protocol variables values stream, and (F) Message authentication code.

45. A method according to claim 40, further comprising receiving a network control protocol write variables request message requesting writing of at least one protocol variable.

46. A method according to claim 45, wherein fields of the network control protocol write variables request message include at least one of (A) Network time, (B) Protocol variables requested, (C) Node ID of target device, (D) Request counter, (E) Protocol variables values stream and (F) Message authentication code.

47. A method according to claim 45, further comprising receiving a network control protocol write variables response message responding to a network control protocol write variables request message.

48. A method according to claim 47, wherein fields of the network control protocol write variables response message include at least one of (A) Network time, (B) Protocol variables requested, (C) Node ID of replying device, (D) Request counter and (E) Message authentication code.

49. A method according to claim 40, further comprising receiving a broadcast request message, whereby in response, replying nodes back off their reply up to a delay amount, defined by a delay application variable.

50. A method according to claim 40, wherein said at least one protocol variable is used with at least one default value including a network time poll holdoff delay, a network time master holdoff delay, a network time query poll time, a network time master declaration wait, a network time subordinate declaration wait, a network time declaration poll time, a network time master response wait and a network time maximum message skew.

51. A method according to claim 1, wherein said altering includes ignoring a message if there is a threshold difference in time between a send time for the message and a receive time for the message.

52. A method according to claim 1, further comprising assigning a network time by a time master to a message, wherein the network time is a unique number that is reset frequently to prevent replay attack.

53. A method according to claim 1, wherein based on windowing, spoofing is protected against by jamming an imposter message.

54. A method according to claim 1, further comprising tracking the presence of all other nodes on the network in accordance with said at least one application variable.

55. At least one of an operating system, driver code, an application programming interface, a tool kit and a processing device for providing the method of automatically tuning a network of claim 1.

56. A modulated data signal carrying computer executable instructions for performing the method of claim 1.

57. A computer readable storage medium including computer readable instructions for automatically tuning a network having a protocol and a plurality of nodes forming a logical network, the computer readable storage medium comprising:
  instructions for receiving at least one value for at least one application variable, the at least one application variable representative of a network tuning parameter for the logical network and the at least one application variable additionally corresponding to a network time synchronization application variable, wherein at least one node of the plurality of nodes is configured to use the at least one value to detect and ignore replay messages; and
  instructions for altering, based upon said at least one value corresponding to the network time synchronization application variable, at least one of protocol timing and network behavior relating to the at least one node of said plurality of nodes in said network.

58. A computer readable medium according to claim 57, wherein said at least one application variable includes at least one of (A) a variable corresponding to a data link layer, (B) a variable corresponding to a network layer and (C) a variable corresponding to a transport layer.

59. A computer readable medium according to claim 58, wherein said at least one variable corresponding to the network layer includes at least one of (A) a variable corresponding to time and (B) a variable corresponding to presence.

60. A computer readable medium according to claim 58, wherein a variable corresponding to the transport layer determines at least one of (A) time out conditions for dropping a message and (B) how long to wait before re-sending at least one of a request, reply and reply acknowledgement.

61. A computer readable medium according to claim 58, wherein a variable corresponding to the data link layer determines at least one of (A) backoff timeout, (B) acknowledgment retry count and (C) broadcast burst count.

62. A computer readable medium according to claim 58, wherein each node tracks the presence of all other nodes in the logical network by way of at least one variable corresponding to the network layer.

63. A computer readable medium according to claim 57, wherein said at least one application variable is persistently stored.

64. A computer readable medium according to claim 57, wherein the at least one application variable is handled at a network layer of the protocol.

65. A computer readable medium according to claim 57, further comprising:
  assigning values by an Address Space Arbitrator (ASA), wherein the ASA is an entity responsible for managing the network.

66. A computer readable medium according to claim 65, further comprising handling the servicing of at least one application variable by a network control protocol handler, a component of a network layer, wherein said handling includes at least one of (A) handling by the network control protocol handler the persistence of a value of an application variable in storage, (B) providing by the network control protocol handler the value of a variable to a protocol layer other than the network layer through an application interface, (C) accepting by the network control protocol handler a new value of an application variable at the time a device is assigned to a logical network by an ASA, (D) accepting and acknowledging by the network control protocol handler a value of a new variable when instructed by the ASA and (E) providing a value of an application variable when asked by the ASA.

67. A computer readable medium according to claim 65, wherein the ASA updates the at least one application variable when a node is assigned to its logical network.

68. A computer readable medium according to claim 65, wherein the ASA broadcasts the at least one application variable to all nodes on the logical network through a Write message and each node acknowledges the message.

69. A computer readable medium according to claim 65, wherein the ASA unicasts Read and Write variable messages to verify and update a node that has missed a broadcast update.

70. A computer readable medium according to claim 57, wherein said altering is transparent to a layer other than a network layer of the protocol.

71. A computer readable medium according to claim 57, wherein said altering includes dynamically tuning and optimizing the protocol based upon a determination that a specific operating condition exists in the network.

72. A computer readable medium according to claim 71, wherein said specific operating condition includes at least one of (A) low bandwidth operation of the physical medium of the network, (B) potential noise (C) a dynamic determination that there is a weak transmitter node (D) a dynamic determination that there is a weak receptor node, (E) degraded signal quality on a communications path, (F) amount of activity on the network and (G) a specific combination of number and kinds of nodes.

73. A computer readable medium according to claim 72, wherein said at least one application variable includes at least one of (A) an adaptive back off parameter, (B) a timing window for network communications and (C) a threshold for a determination that there is at least one of said specific operating conditions.

74. A computer readable medium according to claim 57, wherein said altering includes cross-correlating with respect to the node segments of the network which node paths are of good quality and which node paths are of poor quality.

75. A computer readable medium according to claim 74, wherein said cross-correlating includes taking into account the rate of network traffic.

76. A computer readable medium according to claim 57, wherein each node member of the logical network maintains a set of at least one value for at least one application variable associated with the node member.

77. A computer readable medium according to claim 76, wherein the set of values is handled by a network layer of the protocol, and saved in persisted storage.

78. A computer readable medium according to claim 57, wherein the at least one value is modified asynchronously.

79. A computer readable medium according to claim 57, wherein said receiving the at least one value includes receiving said at least one value through an application interface exposed by a network layer of the protocol.

80. A computer readable medium according to claim 79, wherein with respect to a data link layer of said protocol, said receiving includes receiving at least one value of an application variable on every call to the application interface.

81. A computer readable medium according to claim 57, wherein the protocol is one of SCP, x10 and CEBus®.

82. A computer readable medium according to claim 57, wherein a physical network underlying the logical network is one of a power line carrier network, a radio frequency network and an infrared transmission network.

83. A computer readable medium according to claim 57, wherein when application variables are altered, further comprising ensuring that the values are consistent across all nodes in the network.

84. A computer readable medium according to claim 57, wherein said at least one application variable at least one of (A) is set during a node acquisition step, (B) is set by default into one of a device and object and (C) is changed during optimization of the network dynamically.

85. A computer readable medium according to claim 57, wherein the at least one application variable comprises a variable length table maintained by the network layer.

86. A computer readable medium according to claim 57, wherein the at least one application variable is at least one of (A) logical network specific, (B) specific to a particular physical network underlying the logical network and (C) specific to a node of the logical network.

87. A computer readable medium according to claim 57, wherein said at least one application variable is at least one protocol variable.

88. A computer readable medium according to claim 87, further comprising receiving a network control protocol read variables request message requesting reading of at least one protocol variable.

89. A computer readable medium according to claim 88, further comprising receiving a network control protocol read variables response message responding to a network control protocol read variables request message.

90. A computer readable medium according to claim 87, further comprising receiving a network control protocol write variables request message requesting writing of at least one protocol variable.

91. A computer readable medium according to claim 90, further comprising receiving a network control protocol write variables response message responding to a network control protocol write variables request message.

92. A computer readable medium according to claim 87, further comprising receiving a broadcast request message, whereby in response, replying nodes back off their reply up to a delay amount, defined by a delay application variable.

93. A computer readable medium according to claim 57, wherein said altering includes ignoring a message if there is a threshold difference in time between a send time for the message and a receive time for the message.

94. A computer readable medium according to claim 57, further comprising further comprising assigning a network time by a time master to a message, wherein the network time is a unique number that is reset frequently to prevent replay attack.

95. A computer readable medium according to claim 94, wherein based on windowing, spoofing is protected against by jamming an imposter message.

96. A computer readable medium according to claim 57, further comprising tracking the presence of all other nodes on the network in accordance with said at least one application variable.

97. At least one computer readable medium according to claim 57, wherein said modules are included in at least one of an application programming interface (API), driver code, an operating system and an application.

98. A distributed computing system capable of automatically tuning a network having a protocol and a plurality of nodes forming a logical network, comprising:
at least one application variable representative of a network tuning parameter for the logical network corresponding to each node of the plurality of nodes, at least one value for the at least one application variable, wherein the at least one application variable additionally corresponds to network time synchronization application variable, further wherein each node of the plurality of nodes is configured to use the at least one value to detect and ignore replay messages; and wherein based upon said at least one value, at least one of protocol timing and network behavior relating to each node of said plurality of nodes in said network is altered.

99. A distributed computing system according to claim 98, wherein said at least one application variable includes at least one of (A) a variable corresponding to a data link layer, (B) a variable corresponding to a network layer and (C) a variable corresponding to a transport layer.

100. A distributed computing system according to claim 99, wherein said at least one application variable corresponding to the network layer includes at least one of (A) a variable corresponding to network time and (B) a variable corresponding to presence.

101. A distributed computing system according to claim 99, wherein a variable corresponding to the transport layer determines at least one of (A) time out conditions after dropping a message and (B) how long to wait before re-sending at least one of a request, reply and reply acknowledgement.

102. A distributed computing system according to claim 99, wherein a variable corresponding to the data link layer determines at least one of (A) backoff timeout, (B) acknowledgment retry count and (C) broadcast burst count.

103. A distributed computing system according to claim 99, wherein each node tracks the presence of all other nodes in the network by way of at least one variable corresponding to the network layer.

104. A distributed computing system according to claim 98, wherein said at least one application variable is persistently stored.

105. A distributed computing system according to claim 98, wherein the at least one application variable is handled at a network layer of the protocol.

106. A distributed computing system according to claim 98, further comprising:
an Address Space Arbitrator (ASA), an entity responsible for managing the network, wherein the ASA assigns values to said at least one application variable.

107. A distributed computing system according to claim 106, further comprising:
a network control protocol handler, a component of a network layer of the protocol, wherein the network control protocol handler handles the servicing of at least one application variable by at least one of (A) handling by the network control protocol handler the persistence of a value of an application variable in storage, (B) providing by the network control protocol handler the value of a variable to a protocol layer other than the network layer through an application interface, (C) accepting by the network control protocol handler a new value of an application variable at the time a device is assigned to a logical network by an ASA, (D) accepting and acknowledging by the network control protocol handler a value of a new variable when instructed by the ASA and (E) providing a value of an application variable when asked by the ASA.

108. A distributed computing system according to claim 106, wherein the ASA updates the at least one application variable when a node is assigned to its logical network.

109. A distributed computing system according to claim 106, wherein the ASA broadcasts the at least one application variable to all nodes on the logical network through a Write message and each node acknowledges the message.

110. A distributed computing system according to claim 102, wherein the ASA unicasts Read and Write variable messages to verify and update a node.

111. A distributed computing system according to claim 98, wherein the altering of said at least one application variable is transparent to a layer other than a network layer of the protocol.

112. A distributed computing system according to claim 98, wherein said distributed system dynamically tunes and optimizes the protocol based upon a determination that a specific operating condition exists in the network.

113. A distributed computing system according to claim 112, wherein said specific operating condition includes at least one of (A) low bandwidth operation of the physical medium of the network, (B) potential noise (C) a dynamic determination that there is a weak transmitter node (D) a dynamic determination that there is a weak receptor node, (E) degraded signal quality on a communications path, (F) amount of activity on the network and (G) a specific combination of number and kinds of nodes.

114. A distributed computing system according to claim 113, wherein said at least one application variable includes at least one of (A) an adaptive back off parameter, (B) a timing window for network communications and (C) a threshold for a determination that there is at least one of said specific operating conditions.

115. A distributed computing system according to claim 98, wherein said distributed system cross-correlates with respect to the node segments of the network to determine which node paths are of good quality and which node paths are of poor quality.

116. A distributed computing system according to claim 115, wherein said cross-correlating includes taking into account the rate of network traffic.

117. A distributed computing system according to claim 98, wherein each node member of the logical network maintains a set of at least one value for at least one application variable associated with the node member.

118. A distributed computing system according to claim 117, wherein the set of values is handled by a network layer of the protocol, and saved in persisted storage.

119. A distributed computing system according to claim 98, wherein the at least one value is modified asynchronously.

120. A distributed computing system according to claim 98, wherein when at least one value of the at least one application variable is received, said at least one value is received through an application interface exposed by a network layer of the protocol.

121. A distributed computing system according to claim 120, wherein when at least one value of the at least one application variable is received with respect to a data link layer of said protocol, said at least one value of an application variable is received on every call to the application interface.

122. A distributed computing system according to claim 98, wherein the protocol is one of SCP, x10 and CEBus®.

123. A distributed computing system according to claim 98, wherein a physical network underlying the logical network is one of a power line carrier network, a radio frequency network and an infrared transmission network.

124. A distributed computing system according to claim 98, wherein when application variables are altered, the distributed system ensures that the values are consistent across all nodes in the network.

125. A distributed computing system according to claim 98, wherein said at least one application variable at least one of (A) is set during a node acquisition step, (B) is set by default into one of a device and object and (C) is changed during optimization of the network dynamically.

126. A distributed computing system according to claim 98, wherein the at least one application variable comprises a variable length table maintained by the network layer.

127. A distributed computing system according to claim 98, wherein the at least one application variable is at least one of (A) logical network specific, (B) specific to a particular physical network underlying the logical network and (C) node specific.

128. A distributed computing system according to claim 98, wherein said at least one application variable is at least one protocol variable.

129. A distributed computing system according to claim 128, wherein at least one component of the distributed system sends a network control protocol read variables request message requesting reading of at least one protocol variable.

130. A distributed computing system according to claim 129, wherein at least one component of the distributed system sends a network control protocol read variables response message responding to a network control protocol read variables request message.

131. A distributed computing system according to claim 128, wherein at least one component of the distributed system sends a network control protocol write variables request message requesting writing of at least one protocol variable.

132. A distributed computing system according to claim 131, wherein at least one component of the distributed system sends a network control protocol write variables response message responding to a network control protocol write variables request message.

133. A distributed computing system according to claim 128, wherein at least one component of the distributed system receives a broadcast request message, whereby in response, replying nodes back off their reply up to a delay amount, defined by a delay application variable.

134. A distributed computing system according to claim 98, wherein a message is ignored if there is a threshold difference in time between a send time for the message and a receive time for the message.

135. A distributed computing system according to claim 98, further comprising:
  a time master for assigning a network time to a message, wherein the network time is a unique number that is reset frequently to prevent replay attack.

136. A distributed computing system according to claim 135, wherein based on windowing, spoofing is protected against by jamming an imposter message.

137. A distributed computing system according to claim 98, wherein the presence of all other nodes on the network is tracked in accordance with said at least one application variable.

138. A logical network formed by a plurality of nodes comprising:
  means for receiving at least one value for at least one application variable, the at least one application variable representative of a network tuning parameter for the logical network and the at least one application variable additionally corresponding to a network time synchronization application variable, wherein at least one node of the plurality of nodes is configured to use the at least one value to detect and ignore replay messages; and
  means for altering at least one of protocol timing and network behavior relating to the at least one node of said plurality of nodes in said network based upon said at least one value.

* * * * *